No. 680,962. Patented Aug. 20, 1901.
J. F. CRUDGINTON.
CARRIAGE LOWERING ATTACHMENT FOR MILLING MACHINES.
(Application filed Oct. 25, 1900.)
(No Model.) 2 Sheets—Sheet 1.
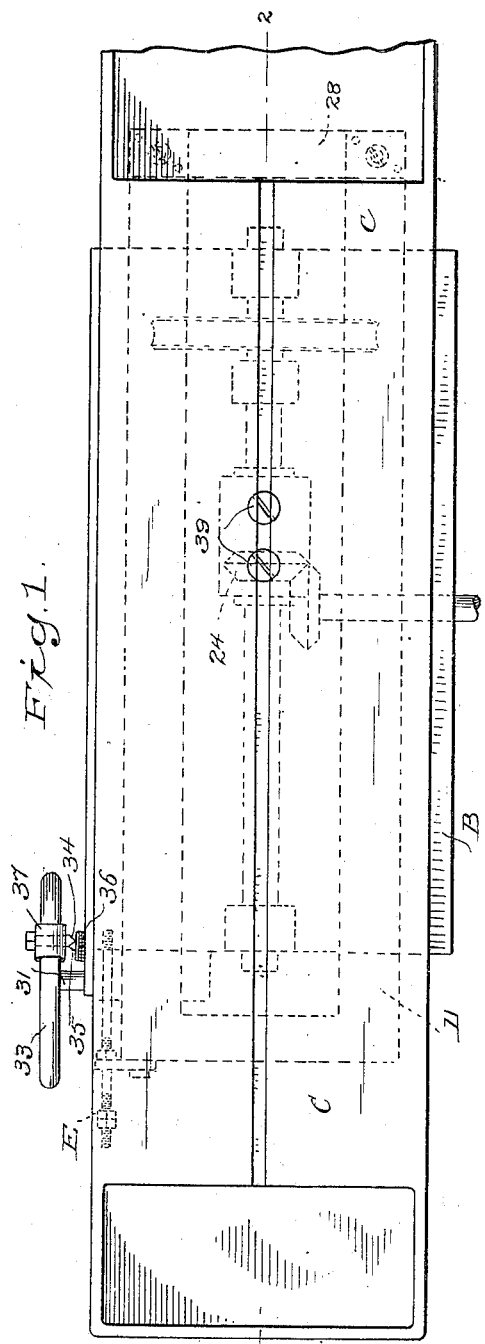
WITNESSES.
INVENTOR.

No. 680,962. Patented Aug. 20, 1901.
J. F. CRUDGINTON.
CARRIAGE LOWERING ATTACHMENT FOR MILLING MACHINES.
(Application filed Oct. 25, 1900.)
(No Model.) 2 Sheets—Sheet 2.
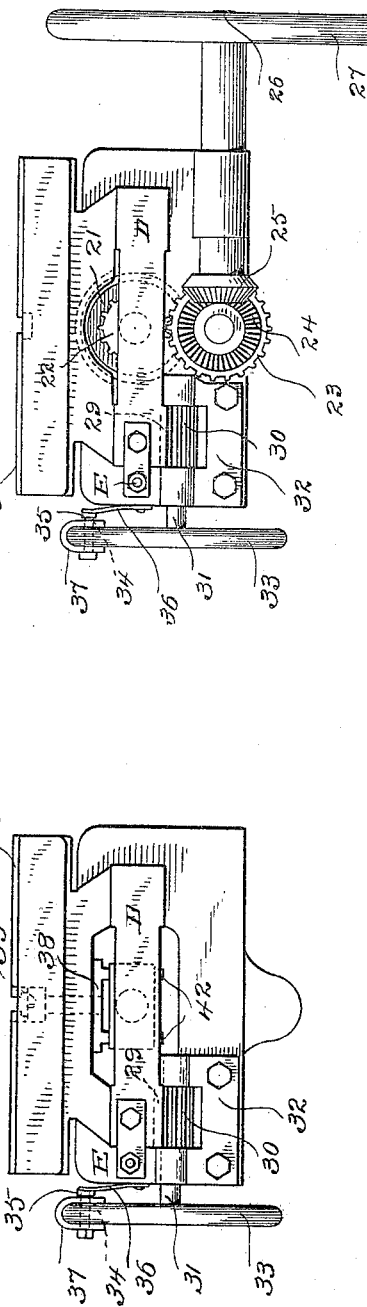
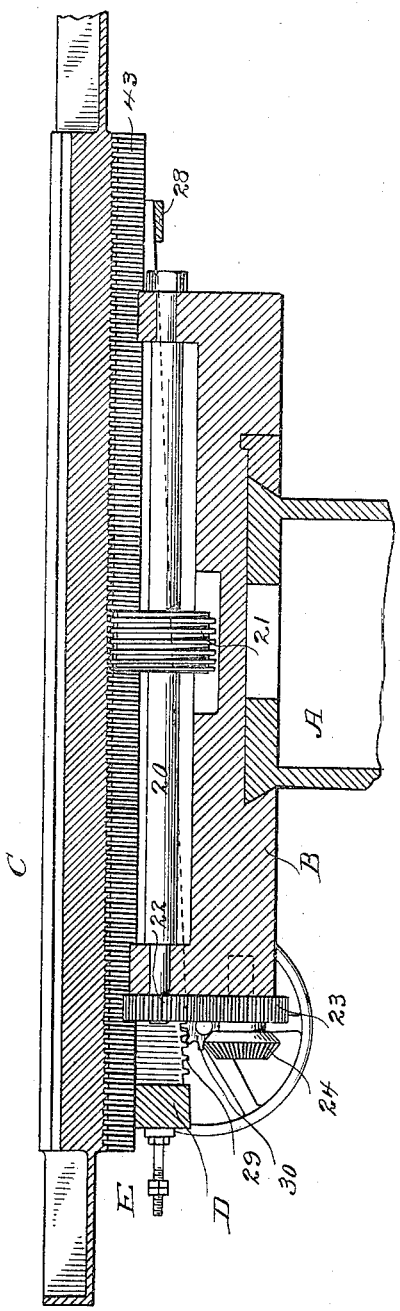
WITNESSES.
H. A. Lamb.
S. W. Atherton.
INVENTOR.
James F. Crudginton
By F. W. Wooster
Atty.

UNITED STATES PATENT OFFICE.

JAMES F. CRUDGINTON, OF BRIDGEPORT, CONNECTICUT.

CARRIAGE-LOWERING ATTACHMENT FOR MILLING-MACHINES.

SPECIFICATION forming part of Letters Patent No. 680,962, dated August 20, 1901.

Application filed October 25, 1900. Serial No. 34,346. (No model.)

*To all whom it may concern:*

Be it known that I, JAMES F. CRUDGINTON, a citizen of the United States, residing at Bridgeport, county of Fairfield, State of Connecticut, have invented a new and useful Carriage-Lowering Attachment for Milling-Machines, of which the following is a specification.

My invention has for its object to provide an attachment for milling-machines which will enable the operator to lower the carriage in order to relieve the pressure of milling-tools upon the work during the return movement and after the return movement to raise the carriage, so as to place the work thereon in position to be operated upon by the milling-tools. It is found in practice that the use of my novel attachment greatly increases the production of the machine, and thus reduces the cost of performing milling operations. This increase in production is effected in two ways: first, in that the relieving of the pressure of the milling tool or tools upon the work enables the carriage to be returned much more easily and quickly, so that an unskilled workman can operate the machine, and, second, in that chipping and breaking of the milling-tools are wholly avoided, and instead of grinding the milling-tools once a day or oftener milling-tools may be used three, four, or even more days without the necessity for regrinding, thereby effecting a saving of many hours' time each week, which has previously been consumed in the grinding of milling-tools.

In order to accomplish the desired result, I interpose a wedge between the carriage and the table, the entire weight of the carriage and the work thereon resting upon the wedge and the latter being movable upon the table to lower and raise the carriage, so that the pressure of the milling-tools upon the work may be relieved in an instant and the carriage, with the work thereon, as quickly returned to the operative position after the return movement.

In the accompanying drawings, forming part of this specification, I have illustrated the application of my invention to two variant types of milling-machines.

Figure 1 is a plan view illustrating the application of my invention to a type of milling-machine in which the carriage is moved by a worm which engages a nut on the under side of the carriage; Fig. 2, a longitudinal section on the line 2 2 in Fig. 1; Fig. 3, a perspective of the nut-bracket detached; Fig. 4, a perspective of the nut detached; Fig. 5, an end view of the table and carriage as seen from the left in Figs. 1 and 2; Fig. 6, a central longitudinal section corresponding with Fig. 2, but illustrating the application of my invention to a type of milling-machine in which the carriage is moved by a worm which engages a worm-groove formed in the under side of the carriage itself; and Fig. 7 is an end view of the table and carriage as seen from the left in Fig. 6.

Reference characters used in the several figures of the drawings indicate the same parts wherever used.

A denotes the bed, B the table, and C the carriage, all of which parts may be of any preferred type, as specifically they form no portion of my present invention. The mechanism for producing the forward and return movements of the carriage may likewise be of any ordinary or preferred construction, as my invention is in no way limited to any special type of carriage or operating mechanism therefor. In both forms illustrated in the drawings, 20 denotes a worm-shaft journaled in the table, and 21 a worm carried thereby. The worm-shaft is also shown as carrying a pinion 22, meshing with a driving gear-wheel 23, which may itself be driven in any ordinary or preferred manner. The return movement of the carriage may be produced in any ordinary or preferred manner, usually by hand. In the present instance I have shown a bevel gear-wheel 24 mounted to turn with driving gear-wheel 23 and in Fig. 7 have shown this gear-wheel as meshing with a bevel-pinion 25, carried by a shaft 26, which also carries a hand-wheel 27 for convenience in operation.

D denotes a wedge upon which the carriage rests and which is of substantially the same size longitudinally and transversely as the carriage, so that the latter shall be supported as solidly as though it rested directly on the table. The shape of this wedge is wholly unimportant so far as the principle of my invention is concerned. In the present instance I have shown the wedge as made U-shaped and the forward ends of the arms thereof as connected by a cross-bar 28 in order to give perfect rigidity to the wedge. The only essential features of the wedge are that the plane of the upper surface thereof is parallel with the plane of the machine and the plane of the under surface thereof is inclined relatively to the plane of the upper surface, the upper surface of the table being inclined to correspond with the inclined under surface of the wedge. Suitable means are of course provided for moving the wedge forward and backward in order to lower and raise the carriage, always maintaining its perfect parallelism with the plane of the machine. In the present instance I have shown the wedge as extending backward from the table and as provided with a rack 29, which is engaged by a pinion 30, carried by a shaft 31, journaled in a bracket 32, secured to the table and provided with a hand-wheel 33.

E denotes a stop to determine the forward movement of the wedge with the required accuracy, the special construction of this stop being of course unimportant so far as the principle of my invention is concerned. In the present instance (see dotted lines, Fig. 1, in connection with the other figures of the drawings) I have shown a stop consisting of a threaded rod extending rearward from the table and passing through an arm extending from the wedge. Nuts upon this rod may be adjusted to limit both the forward and backward movements of the wedge.

As a means of securely locking the wedge at the extreme of its forward movement, so as to prevent the jar of the machine or the action of the milling-tools from moving the wedge backward, and thereby permitting the carriage to drop in use, while at the same time the wedge is left free to be conveniently moved backward at the will of the operator, I place an adjustable incline 34 on hand-wheel 33, which is adapted to be engaged by an incline 35 on a spring 36, bolted to the table. I have shown incline 34 as carried by a clip 37, which may be secured to the rim of the hand-wheel by a set-screw or in any suitable manner. The operation of this lock will be apparent from the drawings. Stop E and clip 37 are adjusted to correspond with each other, so that when hand-wheel 33 is moved toward the right, as seen in Fig. 1, incline 34 will be just carried past incline 35, spring 36 yielding sufficiently to let the incline upon the hand-wheel pass the incline upon the spring. The power of the spring is amply sufficient to retain the inclines in the position shown in Fig. 1 under the ordinary conditions of use. By movement of the hand-wheel, however, the operator readily causes the incline thereon to pass the incline upon the spring, the latter yielding for the purpose, so that the wedge may be withdrawn to lower the carriage for a return movement.

In the form of milling-machine illustrated in Figs. 1 to 5, inclusive, the only change required in the machine is the use of a nut so connected to the carriage as to leave the latter free to move vertically independently of the nut and the worm. In the present instance I have shown this connection as effected by means of a bracket 38, rigidly secured to the under side of the table, as by screws 39.

40 denotes the nut, which is shown as provided with flanges 41. The arms 42 of the bracket lie between these flanges and retain the nut against independent longitudinal movement, so that movement of the nut by the worm will move the carriage longitudinally, the bracket, however, being free to move vertically with the carriage independently of the nut, which, with the worm, has no vertical movement. The use of a nut which is wholly independent of the carriage and is connected to the latter by means of a bracket, itself rigidly secured to the carriage and adapted to move vertically relatively to the nut, constitutes an improvement in this class of milling-machines independently of the use of the wedge, as it lessens the cost of construction and enables the operator to remove a nut as soon as the thread has become worn and replace it by a new one without in any way disturbing the carriage or any of the heavy parts of the machine and very quickly and without requirement for a high grade of mechanical skill.

In the form of milling-machine illustrated in Figs. 6 and 7 the only change required in the machine is that worm-groove 43 in the under side of the carriage, which is engaged by the worm, be deepened sufficiently to permit vertical movement of the carriage—that is to say, I give to this worm-groove in addition to the depth required for engagement with the worm an added depth sufficient to permit a lowering of the carriage from its normal position in order to relieve the pressure of the milling-tools upon the work and allow the return movement of the carriage to be performed easily and quickly.

The operation of my novel attachment will, it is thought, be readily understood from the description already given in connection with the drawings. The wedge being at its normal or raised position, the operation of the machine is precisely as it would be without the attachment. As soon as a milling operation is completed, it being wholly immaterial whether a single mill is used or whether a gang of mills is caused to operate upon one or more pieces of metal simultaneously, the operator moves the hand-wheel backward, thereby moving the wedge backward and causing the carriage to drop sufficiently so that the pressure of the mills upon the work will be wholly relieved, leaving the carriage free to be returned easily and quickly and without the slightest danger of chipping or dulling the mills. As soon as work has been placed in position upon the carriage for another milling operation the operator by means of the hand-wheel moves the wedge inward and raises the carriage, with the work thereon, to its normal position, in which position it is locked by inclines, as already fully described. It should be understood that the carriage remains at all times parallel with the general plane of the machine, there being no longitudinal movement of the carriage except as produced by the worm and no disturbance at any time of its perfect parallelism. In addition to the advantages already described resulting from the use of my novel attachment the use of a gib between the carriage and the table is dispensed with, lost motion between carriage and table being taken up by adjustment of the wedge. I thus provide a solid base for the carriage, simplify and improve the construction, and reduce the cost by dispensing with a part.

Having thus described my invention, I claim—

1. The combination with the table and carriage of a milling-machine, the plane of the under side of the carriage being parallel with the plane of the machine and the plane of the top of the table being inclined to the plane of the machine, of a wedge of substantially the dimensions longitudinally and transversely of the table and having an upper surface parallel with the under surface of the carriage and an under surface parallel with the upper surface of the table, and means for moving said wedge so that the carriage may be lowered and raised without change of parallelism.

2. The combination with the table and carriage of a milling-machine and a worm carried by the table, of a bracket secured to the under side of the table, a nut engaged by the worm and held in position by the bracket, and a wedge intermediate the carriage and table and of substantially the same size longitudinally and transversely as the carriage whereby the carriage and bracket may be lowered and raised without change of parallelism independently of the worm and nut.

3. The combination with the table and carriage of a milling-machine, of a wedge of substantially the same size longitudinally and transversely as the carriage and lying between the table and the carriage by which the latter is supported rigidly, a rack upon said wedge, a pinion mounted upon the carriage and meshing with the rack and means for operating the pinion whereby the wedge may be moved in either direction to raise or lower the carriage.

4. The combination with the table and carriage of a milling-machine, of a wedge intermediate said carriage and table and provided with a rack, a pinion mounted upon the carriage and meshing with the rack, means for operating the pinion whereby the wedge may be moved in either direction to lower and raise the carriage and an adjustable stop to limit the forward movement of the wedge in use, substantially as described.

5. The combination with the table and carriage of a milling-machine, of a wedge intermediate said carriage and table and provided with a rack, a pinion mounted upon the carriage and meshing with the rack, means for operating the pinion whereby the wedge may be moved in either direction to lower and raise the carriage and means for yieldingly locking the wedge in its extreme forward position, whereby the table is retained in operative position in use.

In testimony whereof I affix my signature in presence of two witnesses.

JAMES F. CRUDGINTON.

Witnesses:
 ROBERT F. CRUDGINTON,
 WALTER W. FENTON.